Nov. 16, 1965   P. H. SCHINDLER, JR., ETAL   3,218,376
CASTING TOILET BOWLS AND LIKE CERAMIC WARE
Filed March 19, 1962   7 Sheets-Sheet 1
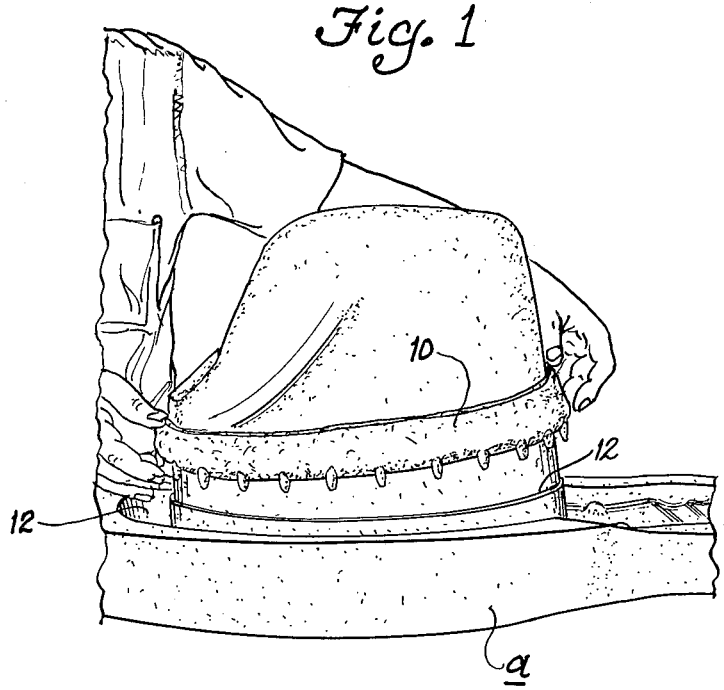
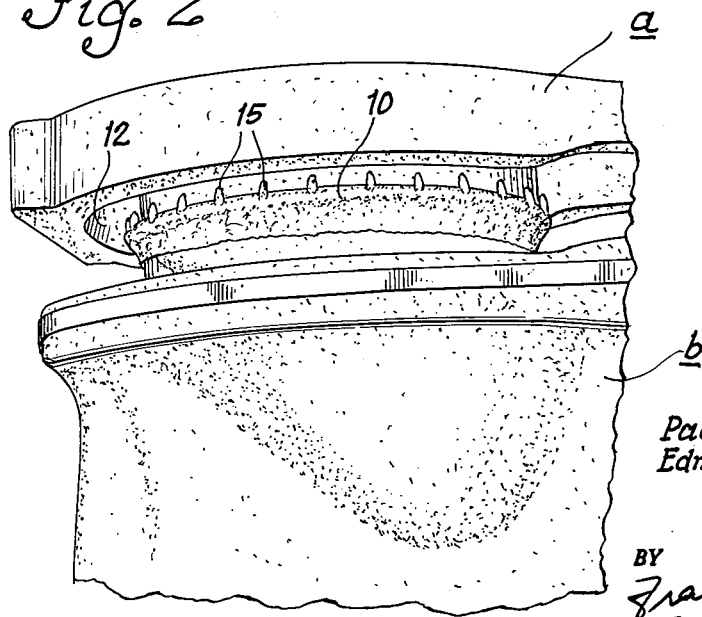
Paul H. Schindler, Jr.
Edmund J. Mozelewski
INVENTORS
BY
Attys

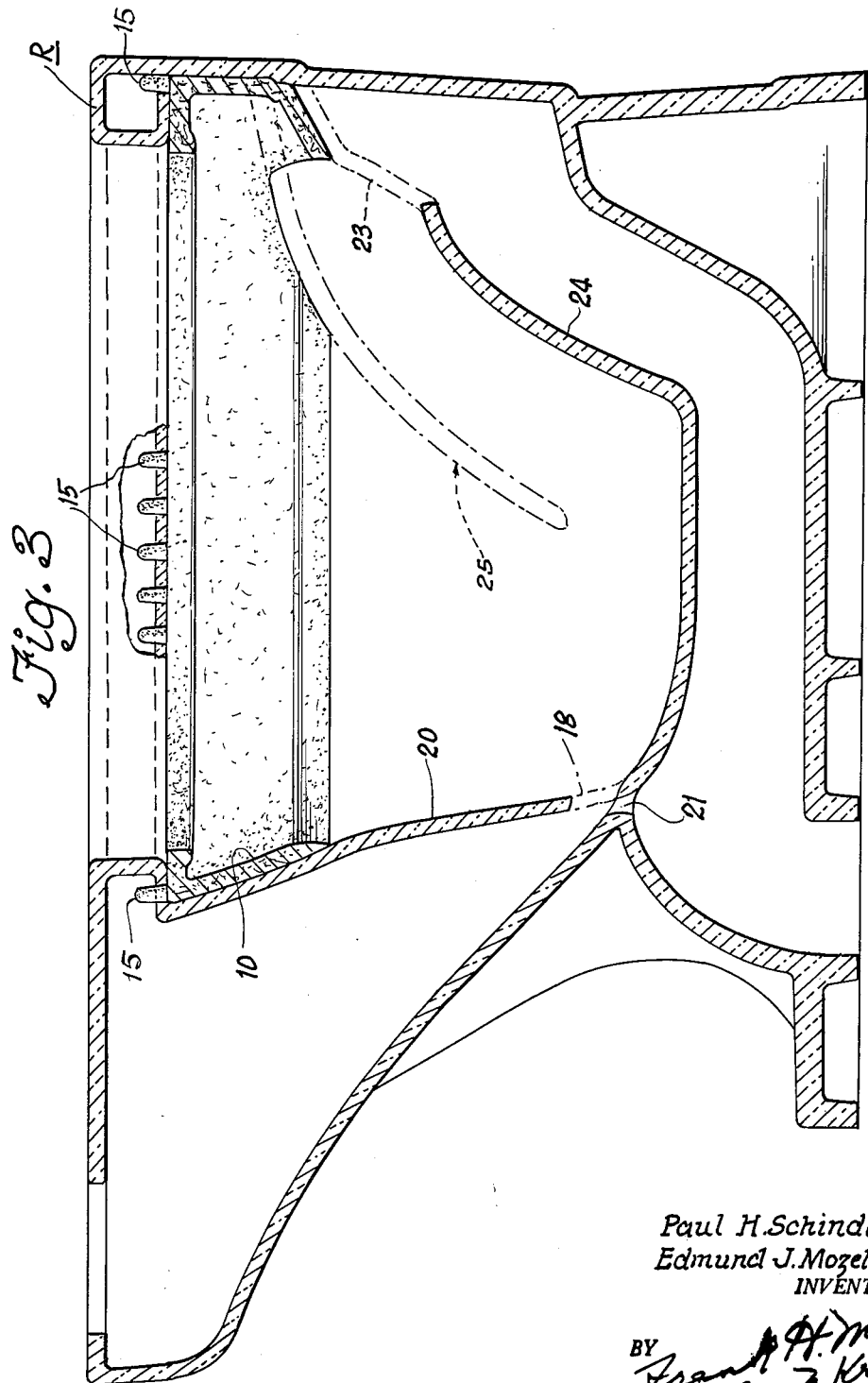

Nov. 16, 1965  P. H. SCHINDLER, JR., ETAL  3,218,376
CASTING TOILET BOWLS AND LIKE CERAMIC WARE
Filed March 19, 1962  7 Sheets-Sheet 3

Paul H. Schindler, Jr.
Edmund J. Mozelewski
INVENTORS

BY Frank H. Marks
Nathan N. Kraus
Attys

Nov. 16, 1965    P. H. SCHINDLER, JR., ETAL    3,218,376
CASTING TOILET BOWLS AND LIKE CERAMIC WARE
Filed March 19, 1962    7 Sheets-Sheet 7

Paul H. Schindler, Jr.
Edmund J. Mozelewski
INVENTORS

United States Patent Office 3,218,376
Patented Nov. 16, 1965

3,218,376
CASTING TOILET BOWLS AND LIKE
CERAMIC WARE
Paul H. Schindler, Jr., Mentone, and Edmund J.
Mozelewski, Redlands, Calif., assignors to Universal Rundle Corporation, New Castle, Pa., a corporation of Delaware
Filed Mar. 19, 1962, Ser. No. 180,586
4 Claims. (Cl. 264—86)

Our invenion relates to the art of casting slip in the manufacture of vitreous ware such as toilet bowls and the like, although it is not necessarily restricted to these specific articles. More particularly, our invention has to do with a new and improved method of casting ceramic articles which will accomplish a number of important advantages in the way of increased efficiency, reduction of cost, etc.

Our invention is especially concerned with improvements in ceramic casting for the purpose of strengthening, supplementing or forming voids, passages, undercuts or holes (hereinafter referred to in general as *negative areas*) in solid or hollow cast clay shapes, by simplification of molds and reduction of costs.

In the manufacture of various articles involving the casting of slip, where negative areas must be produced, it has heretofore been considered necessary to cast such articles in a plurality of separate elements; after casting and before firing, while the cast elements are still moist, they are assembled together to produce an integral piece by a procedure known in the trade as "sticking on." Ordinarily, there may be one cast of major proportions and one or more smaller casts which must be formed separately because of the negative areas in the completed article, such smaller pieces being referred to as "stick-ups." These stick-ups are attached to the main cast after a portion of the water from the slip has been eliminated by drainage and absorption in the mold, usually of plaster or the like, and the mold removed; the surfaces to be joined together are sponged and the stick-ups are then attached to the main cast. Because of the nature of the material, the stick-ups become integrally united with the main cast, which is then fired and vitrefied. A simple illustration of a stick-up would be an ear on a teacup.

The manufacture of toilet bowls and similar articles produced from slip has heretofore required the use of several stick-ups according to the procedure outlined above, despite the fact that such operations are costly and time consuming and generally disadvantageous from many standpoints.

The present invention contemplates a method of producing goods of the character referred to which eliminates the use of major stick-ups. According to our invention, when the slip is cast there is incorporated in the mold an absorbent, flexible and removable or consumable insert to support parts adjacent negative areas, which parts would, according to standard procedure, usually require a stick-up. Such an insert, as more fully described herebelow, is highly absorbent so as to function, similarly to the usual plaster mold, to absorb water from the slip, and may be removable after casting and either disposable, reuseable, or left in situ and fired out.

Among the numerous advantages accruing to the practice of our invention, particularly as applied to toilet bowls, we might mention the following: (1) considerable mold space may be saved on the caster's bench as compared with standard stick-up procedure; (2) great savings in cost are effected by economy of slip; (3) economy of labor and materials in mold production; (4) simplification and reduction in the number of molds; (5) economy of time and labor in the casting procedure; (6) economy of mold storage space; (7) simplification of greenware inspection by elimination of suspect stick-up cracks; (8) elimination of rim stick-up cracks; (9) increased economy by reason of the fact that the articles may be finished wet, simplifying the storage problem heretofore encountered while awaiting the stick-up and drying procedure and reducing labor costs incidental to such procedure; (10) elimination of a blister problem sometimes encountered in dry finishing, and (11) substantial reduction of weight in the finished article, thus reducing shipping costs as well as saving material.

Numerous other advantages will no doubt become apparent to those skilled in the art in connection with the practice of our invention.

As stated above, our invention is especially applicable to toilet bowls, although not restricted thereto, and will, accordingly, be described with particular reference to such articles.

The standard procedure in toilet bowl manufacture, wherein the flushing ring or rim is cast separately from the main portion of the bowl and then stuck on the latter, is described in Kirk Patent No. 952,745, dated March 22, 1910. This procedure has remained essentially standard and unchanged from that period up to the present time.

Referring now to the drawings forming a part of this specification and illustrating a preferred embodiment of our invention, FIG. 1 is a fragmentary perspective view illustrating a step in a method applying our invention in the production of toilet bowls, constituting the placing of an insert of the character described herein on a core mold;

FIG. 2 is a fragmentary perspective view of a step subsequent to that of FIG. 1, constituting the lowering of the core into a mold shell for the casting of a toilet bowl;

FIG. 3 is a front-to-rear, generally medial vertical section through a toilet bowl, essentially of standard "washdown" design, the bowl being shown in the condition in which it exists after casting in accordance with our invention but before removal of the insert seen in the other figures and described herebelow;

Our invention is described herein as especially applied to the casting of toilet bowls. As stated above, the normal practice in the casting of toilet bowls from time immemorial has required the separate casting of the flushing ring, which part constituted a stick-up to be attached to the main piece in moist condition. According to standard practice a total of twelve pieces were required for the molding of all of the parts required for a more or less standard wash-down bowl.

Figure 6:
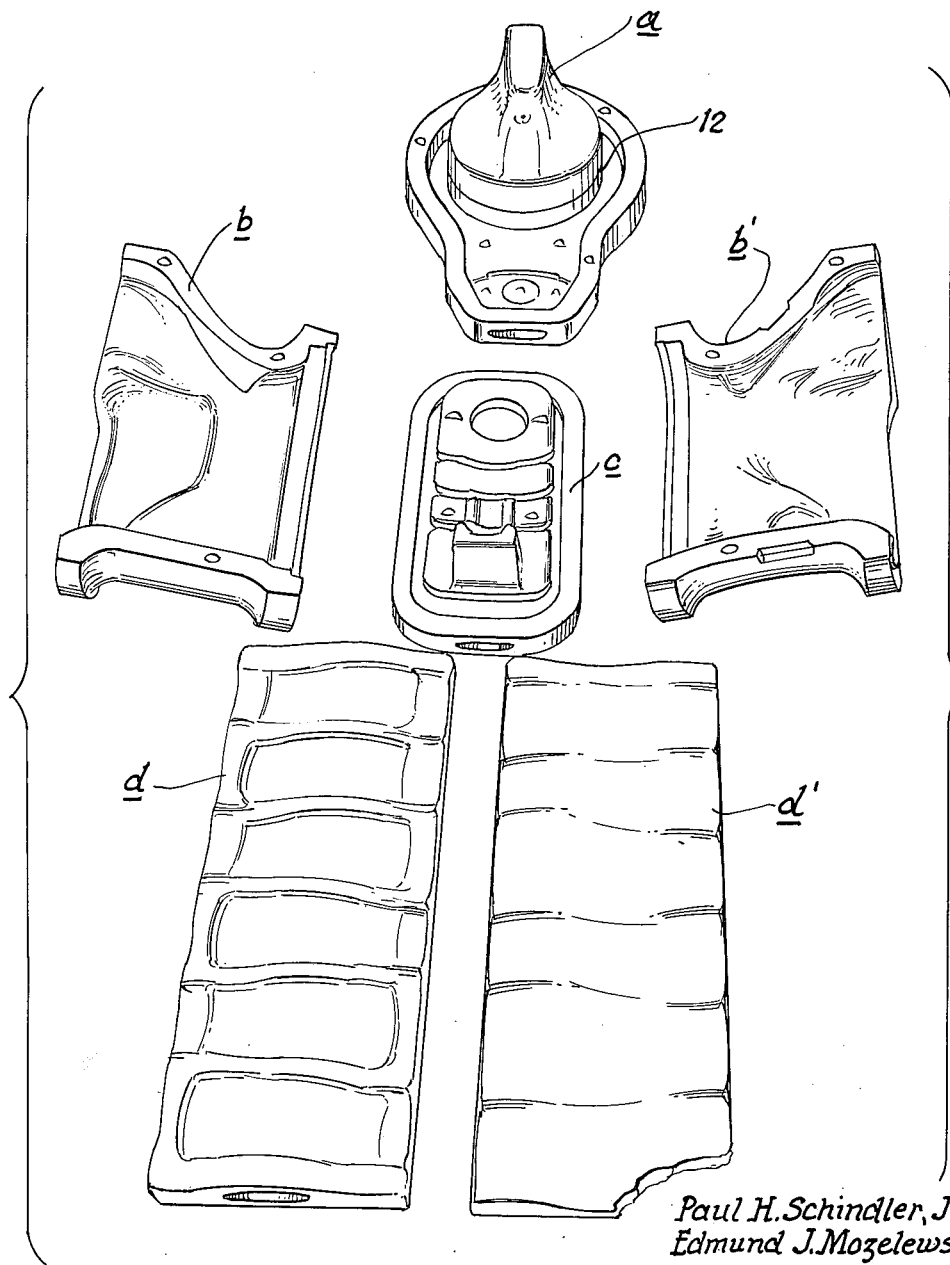
FIG. 6 is a group perspective view of the elements of a mold employed by us in the casting of a toilet bowl in accordance with our invention.

According to our invention, as seen in FIG. 6, only six mold parts are required for the casting of a substantially standard wash-down bowl according to our invention, essentially similar to the product of the twelve-piece mold. These parts comprise a core mold $a$, a pair of substantially similar and opposed body mold parts $b$, $b'$, a base mold part $c$, and a pair of opposed six-unit plate mold parts $d$, $d'$. Thus, it may be seen at the outset that our invention makes possible a reduction of one-half the number of mold parts ordinarily required for the same article.

Figure 7:
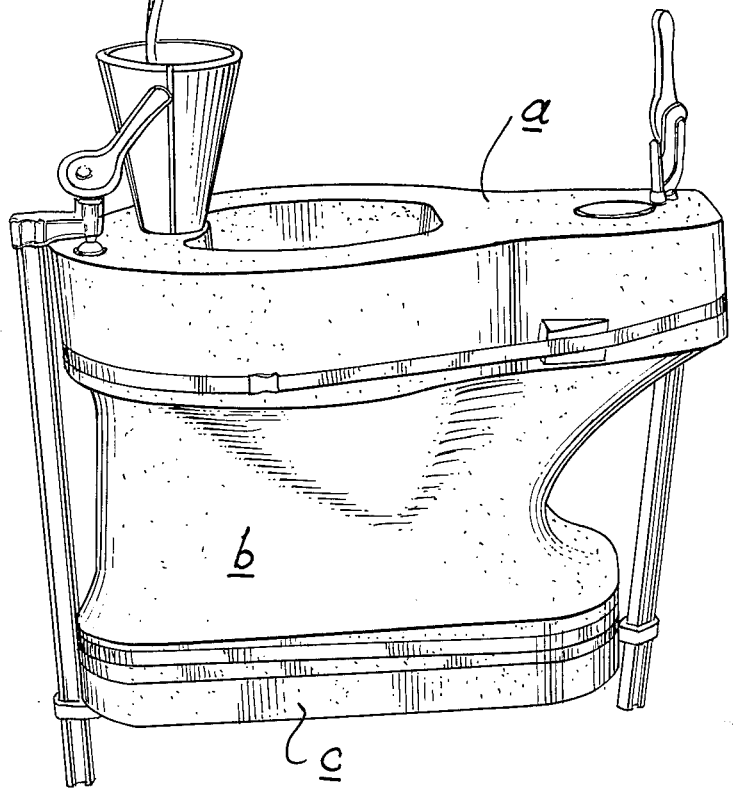
FIG. 7 is a perspective view of the assembled toilet bowl mold, the elements of which are shown separated in FIG. 6, in condition for casting.

The assembly of mold parts, $a$, $b$, $b'$ and $c$ is clearly seen in FIG. 7 in condition for pouring, the parts being secured together according to standard procedure. Assembly of the plate mold $d$, $d'$ is likewise according to well known and standard practice.

In the assembly of the mold, there is first applied to the core $a$, an insert 10 as seen in FIG. 1, a continuous shoulder 12 being provided in the core mold $a$ to position insert 10.

The insert 10, while especially designed, as to its configuration, for a toilet bowl, will have certain characteristics applicable in the casting of a wide variety of ceramic ware having negative areas, as described above, according to our invention. Such an insert may be formed of a variety of materials having certain desired properties. Thus, it should be highly absorbent to water and substantially form-retaining and form-sustaining at the time it is inserted in the mold. When it has absorbed water from the slip it should be relatively flexible in order to facilitate convenient removal by hand from the mold and the cast piece.

We have found especially suitable a material formed of compressed pulp from old newspapers and dried. Such material is quite inexpensive, may be readily molded to the desired form and is extremely absorbent to water. It will hold its shape when dry so that it may be readily inserted in the mold will retain its shape while the clay is setting, and, after casting, is quite flexible in wet condition, so as to be readily removable by hand from the mold. On the other hand, if desired, such material may be consumed in situ on firing, without removal. Alternatively, we may employ an insert formed of a wide variety of synthetic resin foam compositions so selected as to provide the desired physical properties of water absorption capacity, wet flexibility, dry stiffness, etc.

It is also desired that the insert be of sufficient cross-sectional thickness, as seen for example in FIGS. 3, 4, 10 and 11, as compared with the weight of the slip and thickness of the desired casting, that the latter will be readily supported and the insert will not be collapsed by the weight of the adjacent wall of the casting. In the present instance, when employing paper pulp of the character herein described for this particular purpose, i.e., the casting of a toilet bowl flushing rim, the desired configuration is best seen from the drawings as aforesaid, preferably ranging in height from about 3⅜ inches to 2 3/16 inches and in width from about 1⅛ inch to 1 inch. The walls of the insert should, of course, be of sufficient thickness, as seen in the sectional views of the drawings, to support the weight of the clay. The dimensions of the insert will, of course, have to be determined according to the character of the particular piece which is being cast, and are not critical.

When paper pulp of the character referred to above is employed for the insert, it is desired to apply a slight coating of powdered flint, talc or the like to the outside surface of the insert, this coating improving the rate of cast and also preventing the paper insert from sticking to the cast after the latter has been deposited thereon. The thickness of the aforesaid coating is not especially critical; it need only be sufficient to provide the properties referred to without detracting importantly from the water absorption capacity of the insert.

Figure 4:
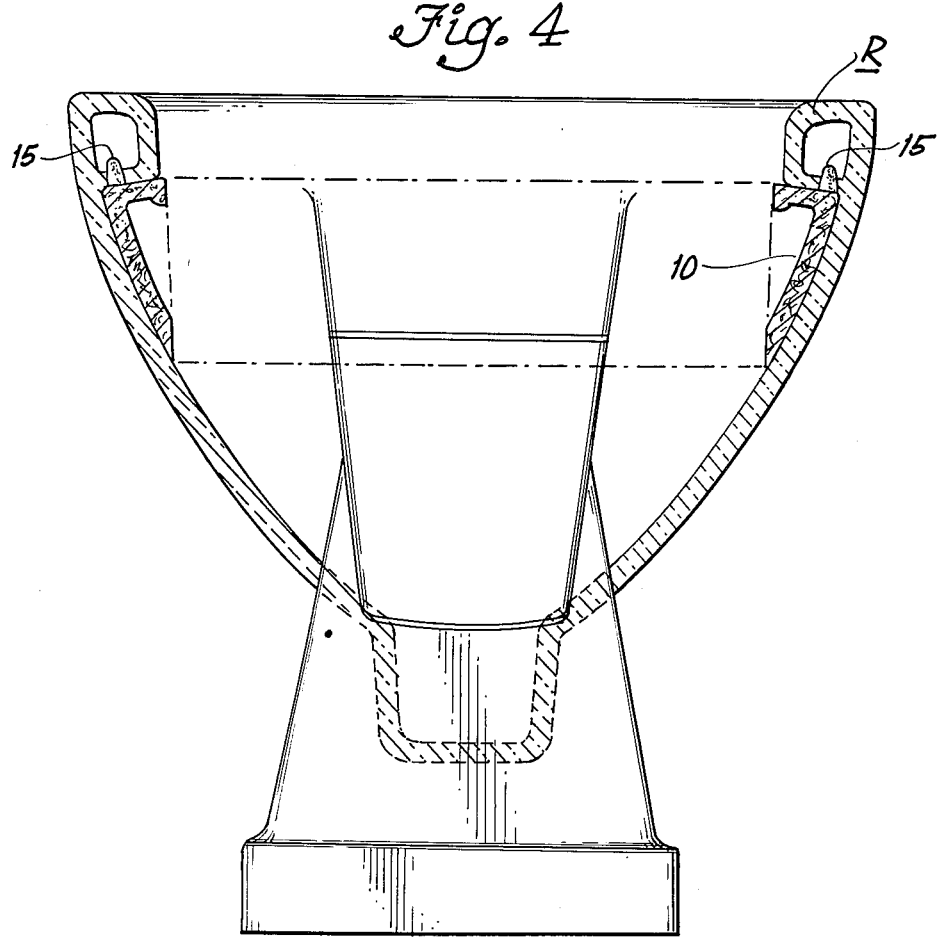
FIG. 4 is a vertical sectional view of the toilet bowl shown in FIG. 3 and at the same stage of production, taken on a plane transverse to that of FIG. 3.
Figure 5:
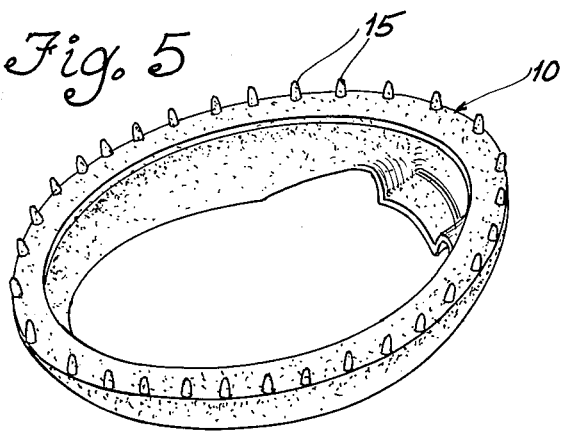
FIG. 5 is a perspective view of an insert employed in accordance with our invention in the casting of a toilet bowl.

It will be noted that in our embodiment of the invention described herein, the insert, as seen in perspective in FIG. 5, is provided with a plurality of tapered nodules or projections 15 for the purpose of providing the usual apertures in the flushing rim R for discharge of water into the toilet bowl. It is desired to apply to the surface of said projections or nodules 15 a coating of some material which will render the nodules non-water-absorbent and which facilitate removal of these projections from the damp and frangible clay. To this end we preferably apply a liquid paraffin to the nodules 15, as by dipping or spraying, etc., although other materials could be used in lieu thereof, such as polyethylene, a petroleum grease, etc., the principal consideration being that such coating material be not water soluble or readily water dispersable. We prefer to apply a paraffin which is solid at room temperature and having a melting point of about 140° F., although obviously such is not critical.

When newspaper pulp is employed, some ash residue would of course be left if the insert were to be fired in the casting. If desired, however, a substantially ash-free pulp might be employed to be fired out in the kiln. If removed, such paper-pulp inserts are of such low economic value that they may be destroyed after a single use and a new insert employed in each case. However, it is contemplated by our invention that a reusable insert might be used, to be formed of a molded foam of a suitable synthetic resin having the desired physical and chemical properties, such as a polyurethane resin. In such case, the insert, after use, need only be rinsed of the slip adhering thereto and dried, and is then ready for reuse.

In accordance with our invention, insert 10 is applied to the core mold $a$ in the manner indicated in FIG. 1 and the mold is then reversed in position and inserted in the body mold formed of the mating parts $b$, $b'$, as seen in FIG. 2. The completed mold in condition for pouring will be as seen in FIG. 7.

Figure 8:
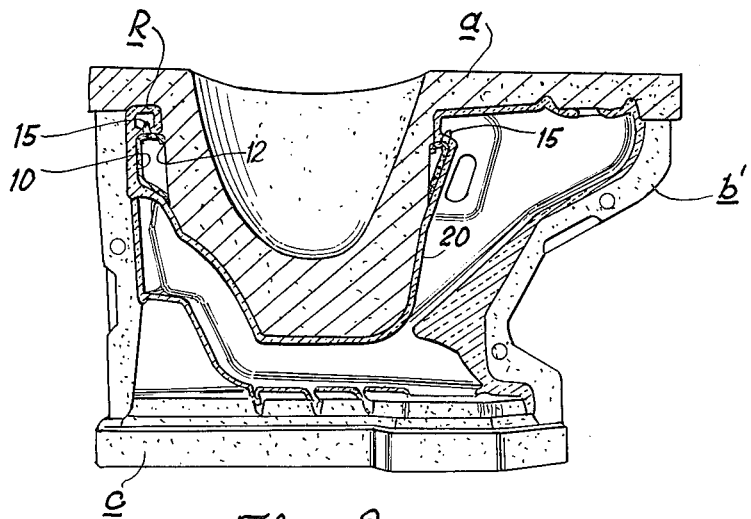
FIG. 8 is a vertical front-to-rear section, slightly in perspective, of a toilet bowl after casting, in place in the mold of FIGS. 6 and 7.
Figure 10:
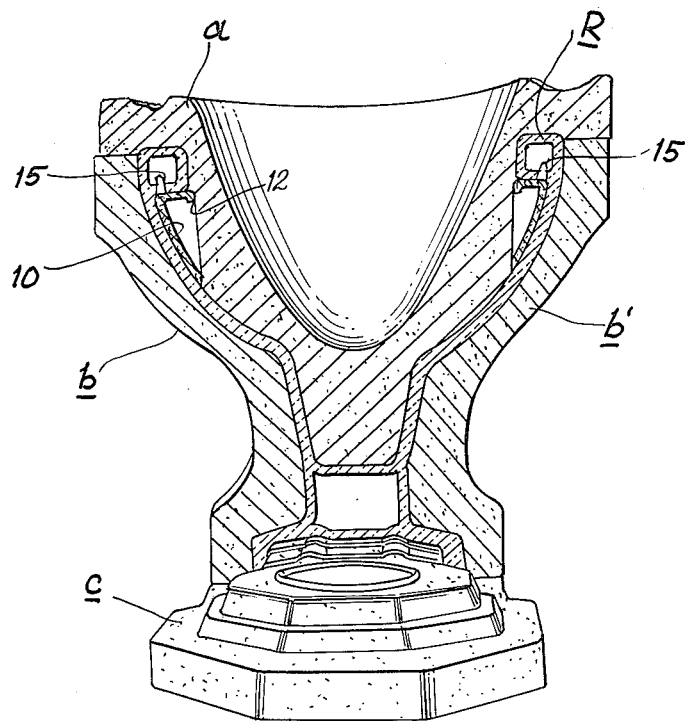
FIG. 10 is a vertical section, slightly in perspective, of the mold and casting in the same condition as in FIG. 8, at right angles thereto.

After the pouring operation and after the clay has been deposited from the slip, the mold and the cast piece will be in substantially the condition seen in FIGS. 8 and 10, from which it will be clear that the flushing ring or rim R has been cast integrally and simultaneously with the main body of the bowl in a single operation, contrary to prior standard practice, as described above.

Figure 9:
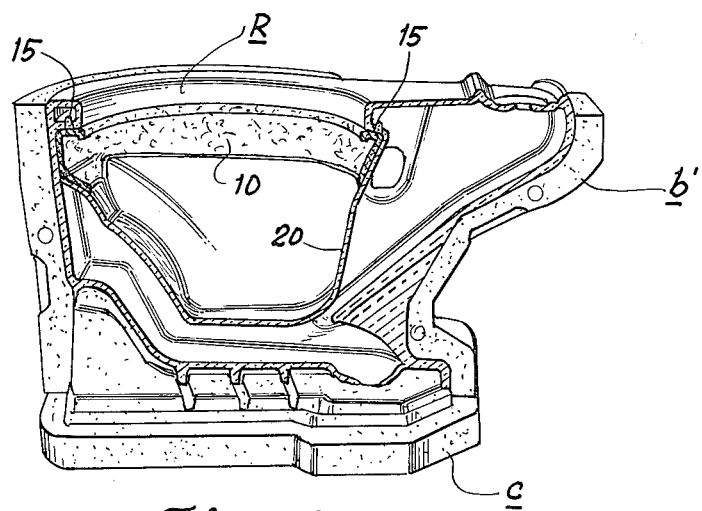
FIG. 9 is a similar view to that of FIG. 8 after removal of the core.
Figure 11:
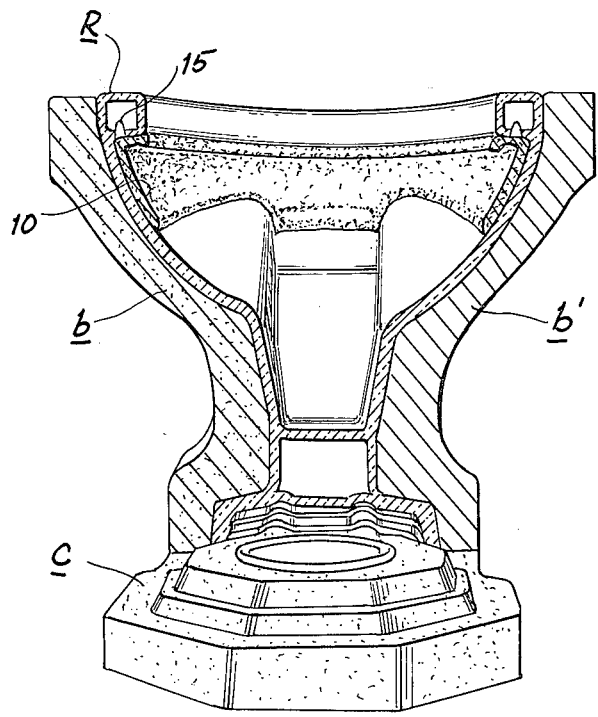
FIG. 11 is a view similar to FIG. 10 after removal of the core, as in FIG. 9.

After the pouring and setting have taken place, the core $a$ is removed from the rest of the mold in a reverse of the operation seen in FIG. 2, except that now the insert 10 will remain behind in place within the casing, as seen in FIGS. 9 and 11. The next operation will be the removal of insert 10, which may be readily accomplished by a simple manual operation, care being taken, of course, especially with regard to the nodules 15, not to injure the walls of the flushing ring or its apertures, the moist clay being highly frangible at this stage.

It will be understood that in a separate operation the pouring is accomplished in connection with the plate mold $d$, $d'$. In this case, likewise, a saving is accomplished inasmuch as only a single standard plate mold for a front pan as described below is required according to our invention, whereas, according to standard procedure, a pair of plate molds of two different sizes is required for the front and back pan, respectively. In our invention the usual back pan is molded integrally with the main body in one casting operation. Numerous other operations required according to standard procedure are also eliminated by our invention.

After removal of the core mold $a$ and the mold parts $b$, $b'$ and $c$, a jet opening 18 is cut out at or near the base of wall 20, which includes the usual back pan, and a passage 23 is cut out of front wall 24, as seen in FIG. 3. After punching out the jet hole 18, cast drain hole 21, provided for draining the cast area thereabove, is plugged up through the hole 18. Also, a front pan 25, FIG. 3, formed in the plate mold $d$, $d'$, is attached. These steps, of course, are accomplished while the casting is moist. At this point, preferably, we remove the insert 10 unless it is to be fired in place.

The green piece is finished in essentially the same manner as in standard practice.

Our invention effects complete elimination of at least fourteen distinct operations employed in the casting of a similar wash-down bowl according to standard procedure. It will be readily apparent that such simplification and reduction of labor, along with the other advantages outlined above, results in a tremendous economic saving.

It will be apparent to those skilled in the art that our invention may be applied to a wide variety of cast ceramic ware having negative areas, as defined above, such as trailer hoppers, urinals, lavatory anti-splash rings, etc.

Various changes coming within the spirit of our invention may suggest themselves to those skilled in the art; hence, we do not wish to be limited to the specific embodiments shown and described or uses mentioned, but intend the same to be merely exemplary, the scope of our invention being limited only by the appended claims.

We claim:

1. The method of casting a toilet bowl having front and rear walls and incorporating an integral flushing ring, comprising setting up a multiple-part porous mold for the bowl and flushing ring, fitting a removable moisture-absorbent insert upon a core, inserting the fitted core into the porous mold in such position that the insert will underlie the flushing ring when formed, pouring slip through the pores in said mold and insert to effect a forming of the toilet bowl and integral flushing ring, separating the core from the mold and insert and removing the mold from the molded bowl, thereby leaving the insert in engagement with the flushing ring, removing clay from the front and rear walls of the bowl while moist to provide a fluid outlet and fluid inlet in the bowl, respectively, separately molding a pan and attaching said pan while the clay is moist to the front wall of the bowl above the outlet opening therein, and firing the bowl so formed.

2. The method of casting a toilet bowl incorporating an integral flushing ring, comprising
   (a) setting up a multiple-part porous mold for the bowl and flushing ring,
   (b) fitting a removable moisture-absorbent insert upon a core,
   (c) inserting the fitted core into the mold in such position that the insert will underlie the flushing ring when formed,
   (d) pouring slip into the mold,
   (e) permitting the mold to stand while water is absorbed from the slip and clay is deposited therefrom onto the surfaces of said mold, core and insert adjacent the slip to form a toilet bowl and integral flushing ring,
   (f) separating the mold and core from the so-molded bowl, including the integral flushing ring, and
   (g) firing the bowl.

3. A method as in claim 2, wherein, after said core is separated from the mold and before firing, said insert is removed from the molded bowl.

4. A method as in claim 3, wherein the insert is allowed to remain in place on the molded bowl and is substantially destroyed in situ when the bowl is fired.

References Cited by the Examiner

UNITED STATES PATENTS

| | | | |
|---|---|---|---|
| 748,996 | 1/1904 | Spencer | 18—39 |
| 2,030,200 | 2/1936 | Gallup | 264—317 |
| 2,288,661 | 7/1942 | Wadman | 25—156 |
| 2,303,303 | 11/1942 | Schleicher | 264 |
| 2,338,806 | 1/1944 | Ellingwood | 18—39 |
| 2,835,019 | 5/1958 | Thiess | 25—156 |
| 3,090,094 | 5/1963 | Schwartzwalder | 264 |

ROBERT F. WHITE, *Primary Examiner.*

MORRIS LIEBMAN, ALEXANDER H. BRODMERKEL, *Examiners.*